US005359317A

United States Patent [19]

Gomez et al.

[11] Patent Number: 5,359,317

[45] Date of Patent: Oct. 25, 1994

[54] METHOD AND APPARATUS FOR SELECTIVELY STORING A PORTION OF A RECEIVED MESSAGE IN A SELECTIVE CALL RECEIVER

[75] Inventors: Fernando A. Gomez, West Palm Beach; Mark T. Stair, Delray Beach, both of Fla.

[73] Assignee: Motorola, Inc., Schaumburg, Ill.

[21] Appl. No.: 958,847

[22] Filed: Oct. 9, 1992

[51] Int. Cl.[5] .................................... H04Q 7/00

[52] U.S. Cl. ........................ 340/825.44; 340/825.22

[58] Field of Search .................... 340/825.44, 825.22, 340/825.44, 825.22

[56] References Cited

U.S. PATENT DOCUMENTS

| | | | |
|---|---|---|---|
| 4,839,628 | 6/1989 | Davis et al. | 340/825.44 |
| 4,872,005 | 10/1989 | DeLuca et al. | 340/825.44 |
| 4,894,649 | 1/1990 | Davis | 340/825.22 |
| 5,075,684 | 12/1991 | DeLuca | 340/825.44 |
| 5,177,477 | 1/1993 | Fennell et al. | 340/825.44 |
| 5,258,739 | 11/1993 | DeLuca et al. | 340/825.44 |

*Primary Examiner*—Donald J. Yusko
*Assistant Examiner*—Gregg V. Miller
*Attorney, Agent, or Firm*—R. Louis Breeden; Thomas G. Berry

[57] ABSTRACT

A method and apparatus allows a user to selectively store (604) a portion of a received message in a selective call receiver (100). The selective call receiver (100) includes first and second memory elements (118) for storing the received message and the portion thereof, respectively. The second memory element has a plurality of partitions (122, 124, 126, 128) corresponding to a plurality of file types. The user defines (FIG. 5) the portion of the received message stored in the first memory element, which portion is to be stored in the second memory element, and then selects (602) one of the plurality of partitions (122, 124, 126, 128) for storing the defined portion of the received message. The defined portion of the received message is then stored (604) in the selected one of the plurality of partitions (122, 124, 126, 128).

22 Claims, 4 Drawing Sheets

METHOD AND APPARATUS FOR SELECTIVELY STORING A PORTION OF A RECEIVED MESSAGE IN A SELECTIVE CALL RECEIVER

FIELD OF THE INVENTION

This invention relates in general to selective call receivers, and more specifically to a method and apparatus for selectively storing a portion of a received message in a selective call receiver.

BACKGROUND OF THE INVENTION

Selective call receivers having an alphanumeric display for displaying received messages and a memory for storing the received messages are well-known in the art. Such receivers typically have had a limited amount of memory for storing message characters, e.g., memory for 2,000 characters. Consequently, received messages could not be retained indefinitely, because the messages would accumulate over time and overflow the limited amount of memory. Even as new selective call receivers are designed and constructed with larger amounts of memory, there is still a limit to the amount of information that can be stored.

Conventional selective call receivers have offered a user a limited choice regarding the retention of received messages in memory. Typically the user has been able either to retain a received message in its entirety or to delete a received message in its entirety. Also typically, there has not been a way to organize retained messages.

Still, some portions of a received message, e.g., a sender's name and telephone number, might be far more important for the user to retain than some other parts of a received message. Currently, a user must consume memory sufficient to store a whole message, even though the user is interested in only a small part of the information contained therein. The ultimate result is memory waste.

Thus, what is needed is a way of retaining the interesting parts of a received message without having to retain the uninteresting parts. What is also needed is a way of organizing the retained message parts to facilitate recalling them at a future time.

SUMMARY OF THE INVENTION

One aspect of the present invention is a method for selectively storing by a user a portion of a received message in a selective call receiver. The selective call receiver comprises first and second memory elements for storing the received message and the portion thereof, respectively. The second memory element has a plurality of partitions corresponding to a plurality of file types. The method comprises the steps of defining by the user the portion of the received message stored in the first memory element to be stored in the second memory element, and selecting by the user one of the plurality of partitions for storing the defined portion of the received message. The method further comprises the step of storing in the selected one of the plurality of partitions the defined portion of the received message.

Another aspect of the present invention is a selective call receiver including an apparatus for selectively storing by a user a portion of a received message in the selective call receiver. The selective call receiver comprises a receiver element for receiving a signal comprising an address and a message, and a decoder coupled to the receiver element for decoding the address defining an intended recipient of the message. The selective call receiver further comprises a processor coupled to the receiver element for processing the received message, and a display coupled to the processor for displaying the received message. The selective call receiver also includes a first memory element coupled to the processor for storing the received message, and a second memory element coupled to the processor for storing the portion of the received message. The second memory element comprises a plurality of partitions corresponding to a plurality of file types for categorizing portions of received messages stored therein. The selective call receiver further comprises a user control coupled to the processor for accepting user commands for controlling the processing of the received message. The user control is utilized by the user to define the portion of the received message that is to be stored, and further to select one of the plurality of partitions for storing the portion of the received message .

DESCRIPTION OF THE PREFERRED EMBODIMENT

Figure 1:
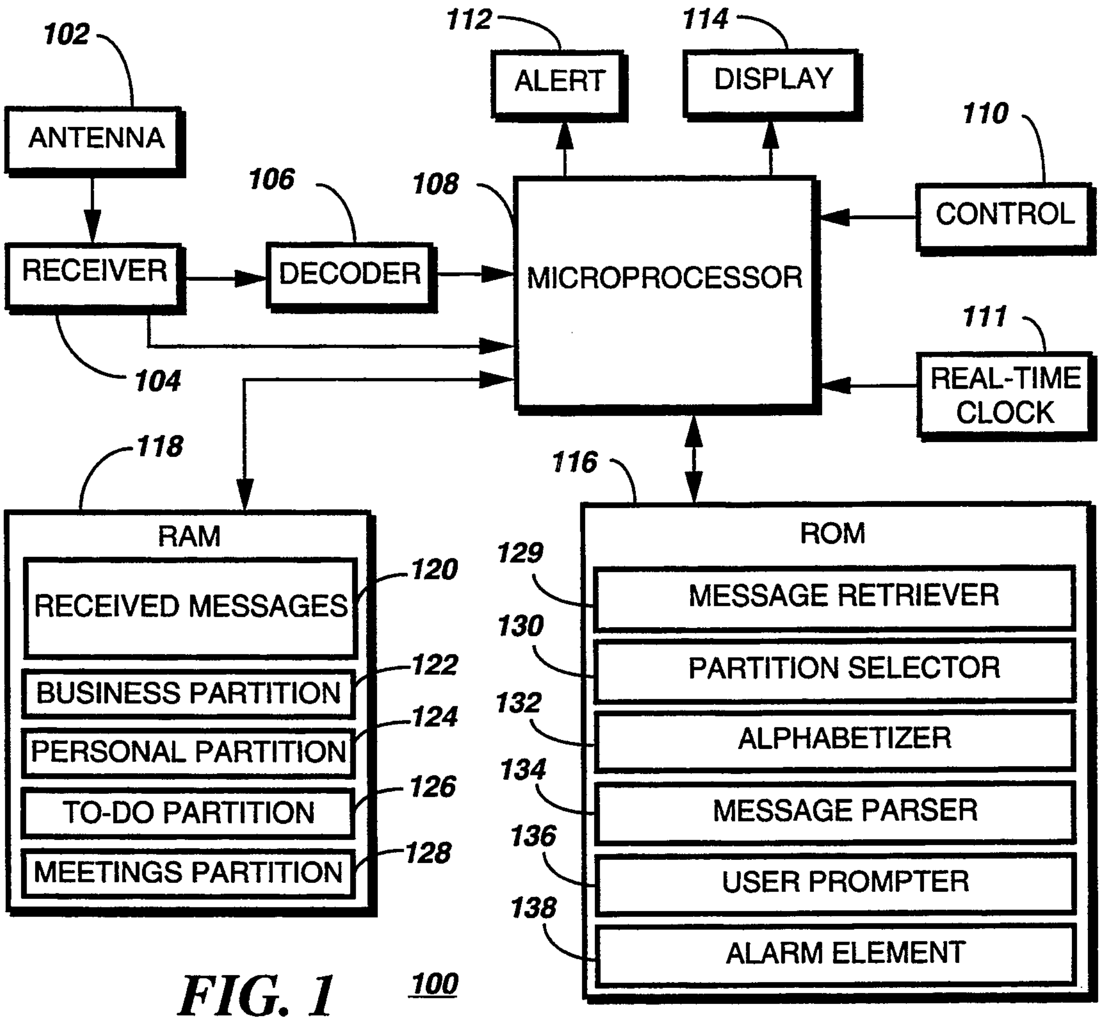
FIG. 1 is an electrical block diagram of a selective call receiver in accordance with the preferred embodiment of the present invention.

With reference to FIG. 1, an electrical block diagram of a selective call receiver 100 in accordance with the preferred embodiment of the present invention comprises an antenna 102 for intercepting RF signals comprising information. The antenna 102 is coupled to a receiver 104 for receiving the intercepted RF signals. A decoder 106 is coupled to the receiver 104 for decoding a selective call address contained within the information received. A microprocessor 108 is coupled to the receiver 104 for processing the information received to recover messages. The microprocessor 108 is also coupled to the decoder 106 for responding to a selective call address decoded therein. An alert device 112 is coupled to the microprocessor 108 for providing an audible or tactile alert to the user when the microprocessor 108 has a message ready for presentation. A display 114 is coupled to the microprocessor 108 for displaying recovered messages. A control section 110 comprises user accessible interfaces for allowing the user to command the microprocessor 108 to perform selective call receiver operations, and includes control switches such as an on/off control button, a cursor control key, and other control keys that are described herein below in accordance with the preferred embodiment of the present invention. A real-time clock 111 is also coupled to the microprocessor 108 for providing an alarm function.

The microprocessor 108 is coupled to and controls a random access memory (RAM) 118 supplied with battery-backed-up power to provide non-volatility of memory contents. The RAM 118 comprises a received message area 120 for storing messages as they are received. The RAM 118 further comprises a business partition 122 for storing portions of business messages, and a personal partition 124 for storing portions of personal messages. In addition, the RAM 118 comprises a to-do partition 126 for storing portions of messages requiring future action, and a meetings partition 128 for storing portions of messages related to meetings. As will be apparent to one of ordinary skill in the art, the number of the partitions 122, 124, 126, 128 may be changed to a greater or lesser number, and the partitions 122, 124, 126, 128 may be either of fixed size or dynamically controlled size, i.e., size adjusted according to data storage requirements for each file type.

The microprocessor 108 also is coupled to a read-only memory (ROM) 116 for accessing stored software algorithms for performing various tasks in accordance with the preferred embodiment of the present invention. The software algorithms include a message retriever 129 for retrieving received messages stored in the RAM 118, a partition selector 130 for selecting a partition 122, 124, 126, 128 corresponding to a selected file type, and an alphabetizer 132 for storing message portions in alphabetical order within each partition 122, 124, 126, 128. In addition, there is a message examiner 134 for examining a message portion to determine whether the message portion contains date and time information. Also included are a user prompter 136 for prompting the user to respond about setting an alarm, and an alarm element 138 for setting and generating an alarm.

Figure 2:
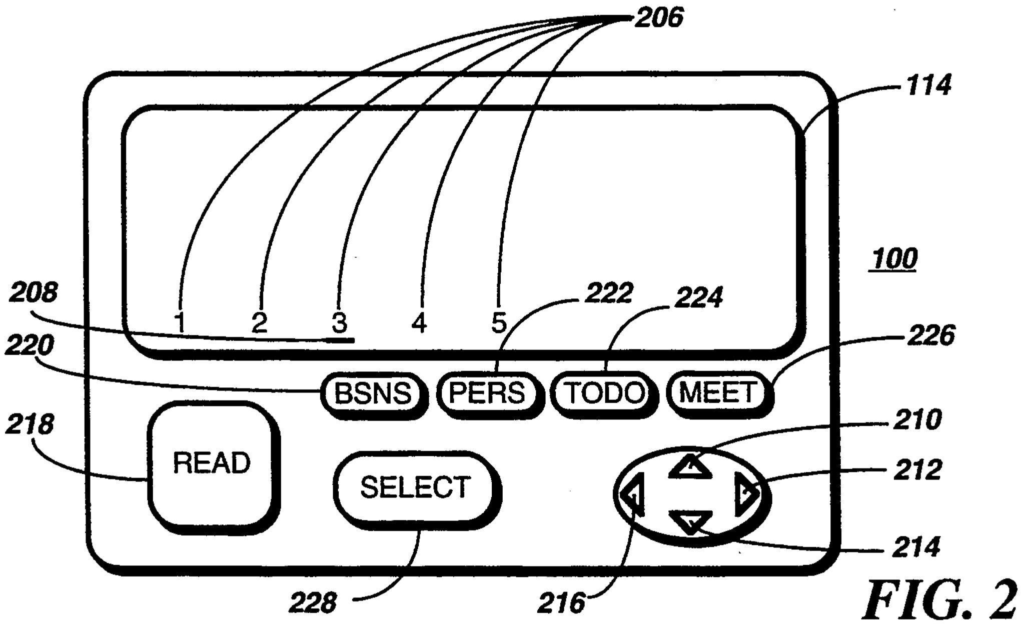
FIG. 2 is an orthographic front view of the selective call receiver depicting a status screen having a cursor and message identifiers for five received messages in accordance with the preferred embodiment of the present invention.

With reference to FIG. 2, an orthographic front view of the selective call receiver 100 depicts a status screen having a cursor 208 and message identifiers 206 for five received messages in accordance with the preferred embodiment of the present invention. The selective call receiver 100 includes curser control keys comprising an up key 210, a right key 212, a down key 214, and a left key 216. The curser control keys 210, 212, 214, 216 are used to move the curser 208 to character positions in received messages and to message identifiers 206 for use in selecting the corresponding character position or message identifier 206.

Also included are a read key 218 for displaying a received message corresponding to a selected message identifier 206, and a select key 228 for selecting portions of a displayed received message. In addition there are business, personal, to-do, and meetings file keys 220, 222, 224, 226, respectively. The business file key 220 is used for storing selected message portions in the business partition 122 of the RAM 118 (FIG. 1), and the personal file key 222 is used for storing selected message portions in the personal partition 124 (FIG. 1). Similarly, the to-do key 224 is used for storing selected message portions in the to-do partition 126 (FIG. 1), and the meetings key 226 is used for storing selected message portions in the meetings partition 128 (FIG. 1).

Figure 3:
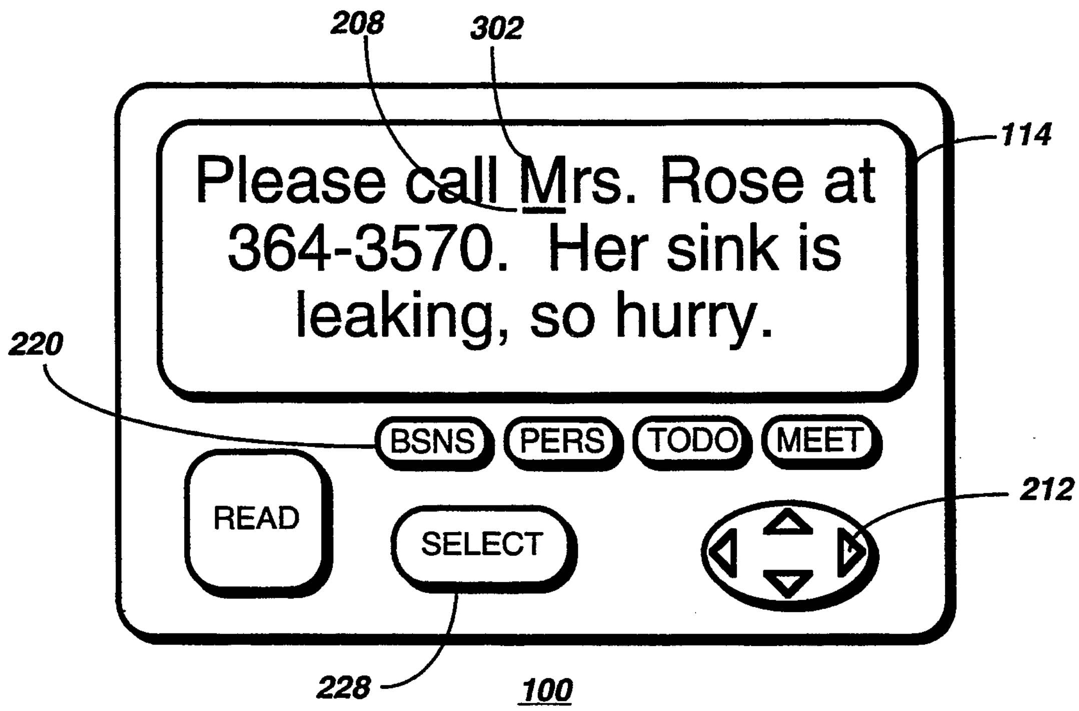
FIG. 3 is an orthographic front view of a selective call receiver depicting a displayed message and the curser for selecting a portion of the displayed message in accordance with the preferred embodiment of the present invention.

With reference to FIG. 3, an orthographic front view of the selective call receiver 100 depicts a displayed message and the curser 208 for selecting a portion of the displayed message in accordance with the preferred embodiment of the present invention. In FIG. 3 a user has depressed one of the file keys 220, 222, 224, 226 to begin a process of selecting at least one message portion for storage. Next, the user has depressed the right key 212 to move the curser 208 under the "M" character 302. If desired, the user may now select the "M" character 302 as the starting point of message portion selection by depressing the select key 228.

Figure 4:
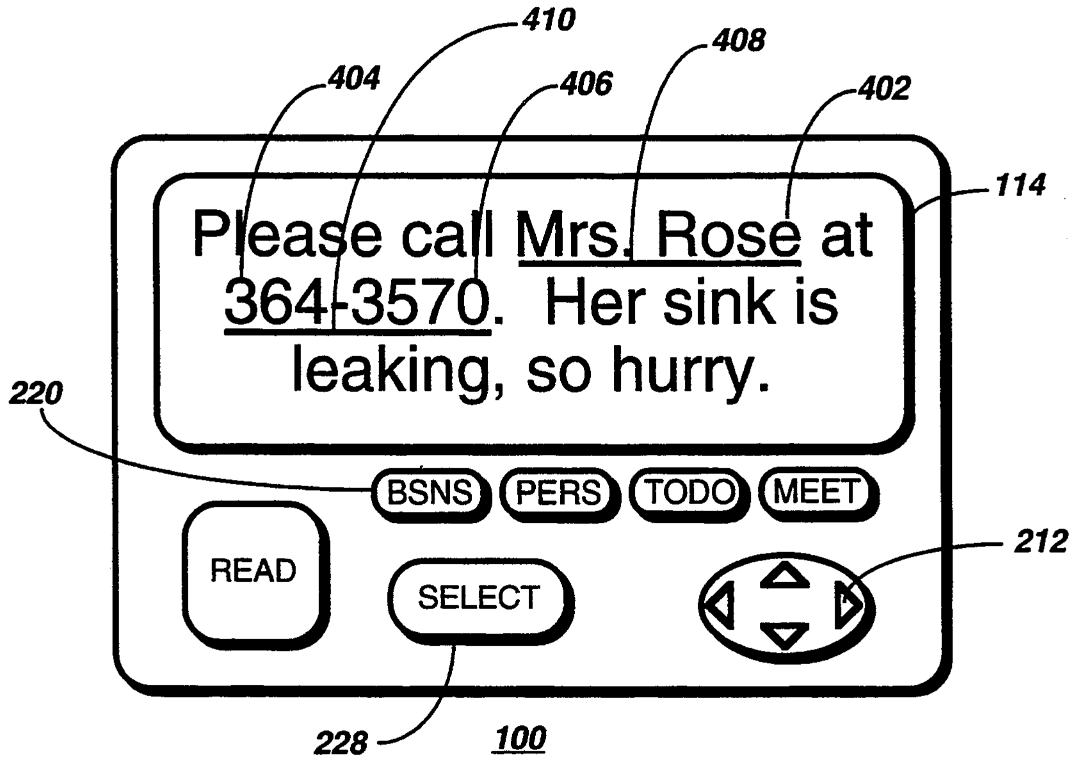
FIG. 4 is an orthographic front view of a selective call receiver depicting selected portions of the displayed message in accordance with the preferred embodiment of the present invention.

With reference to FIG. 4, an orthographic front view of the selective call receiver 100 depicts selected portions of the displayed message in accordance with the preferred embodiment of the present invention. First and second message portions that have been selected are indicated by underlines 408, 410. The selection of the first message portion was accomplished by using the right key 212 to move the curser 208 from the selected starting point at the "M" character 302 (FIG. 3) to an ending point 402, followed by depressing the select key 228. Then the right key 212 was used to move the curser 208 to the starting point 404 of the second message portion, after which the select key 228 was again depressed. Next the right key 212 was used to move the curser 208 to the ending point 406 of the second message portion, after which the select key 228 was again depressed to select the second message portion. At this point of operation, depressing a file key, e.g., the business file key 220, will cause the selected message portions to be stored in the business partition 122 of the RAM 118 (FIG. 1). If desired, e.g., for longer messages, it is of course possible to select more than two message portions for storage.

Figure 5:
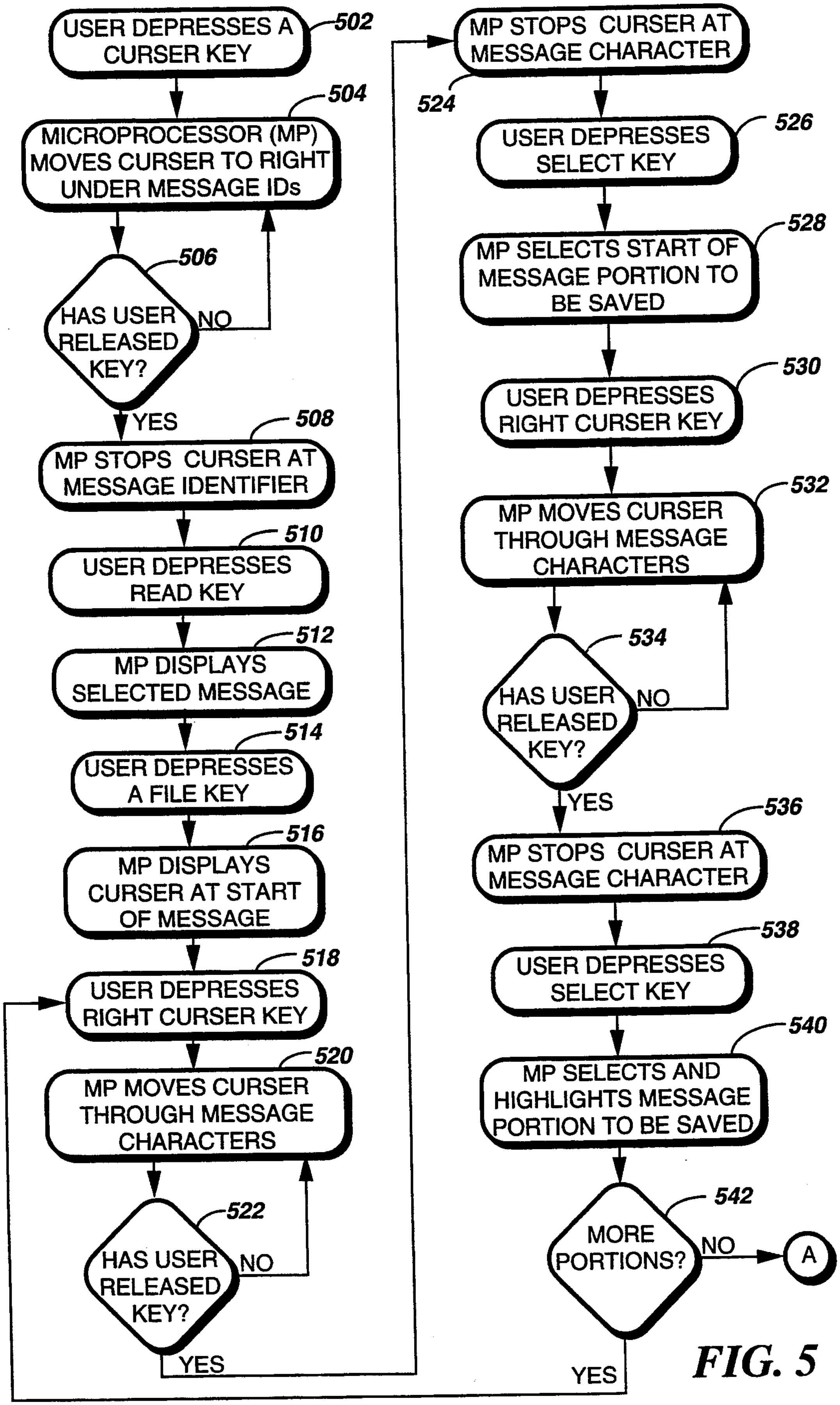
FIG. 5 is a flow chart of the operation of a selective call receiver in accordance with the preferred embodiment of the present invention.

With reference to FIG. 5, a flow chart of the operation of the selective call receiver 100 in accordance with the preferred embodiment of the present invention begins with the display 114 of the selective call receiver 100 (FIGS. 1 and 2) showing received message status by means of the message identifiers 206, as depicted in FIG. 2. The user depresses 502 a curser key, e.g., the right key 212 (FIG. 2), to cause the microprocessor 108 (FIG. 1) to move 504 the curser 208 (FIG. 2) to the right under a message identifier 206. This process repeats until in step 506 the user releases the curser key, at which time the microprocessor 108 stops 508 the curser 208 under a message identifier 206. To display a message corresponding to the message identifier 206 above the curser 208, the user depresses 510 the read key 218 (FIG. 2). In response, the microprocessor 108 accesses the ROM-based message retriever 129 (FIG. 1) and displays 512 the corresponding message.

To begin a process of message portion selection the user next depresses 514 a file key, e.g., the business file key 220 (FIG. 2), which causes the microprocessor 108 (FIG. 1) to display 516 the curser 208 (FIG. 2) at the start of the message. The user then depresses 518 a curser key, e.g., the right key 212 (FIG. 2) to cause the microprocessor 108 to move 520 the curser through the message characters until in step 522 the user releases the curser key, at which time the microprocessor 108 stops moving 524 the curser 208. If the message selected in step 510 is longer than can be displayed on a single screen "page," then in moving the curser 208 the microprocessor 108 will scroll to a new page of the message each time the curser 208 reaches the end of a currently displayed page.

To select a beginning point for a first message portion the user depresses 526 the select key 228 (FIG. 2). This causes the microprocessor 108 (FIG. 1) to select 528 the message character over the curser 208 (FIG. 2) as the start of a message portion to be saved. Next, the user depresses 530 the right key 212 (FIG. 2) to cause the microprocessor 108 to move 532 the curser 208 through message characters to the right. This process continues until in step 534 the user releases the right key 212, at which time the microprocessor 108 stops 536 moving the curser 208. If desired, the user may also adjust the curser position in single steps by using short depressions of the right or left keys 212, 216. The user then depresses 538 the select key 228 (FIG. 2), which causes the microprocessor 108 to select and underline 540 the message portion to be saved from the beginning point through the current curser position. If in step 542 the user desires to select additional portions of the message, then the user depresses the right key 212, and the process repeats from step 518. If in step 542 the user does not desire to select additional message portions, then the process moves to step 602 (FIG. 6).

Figure 6:
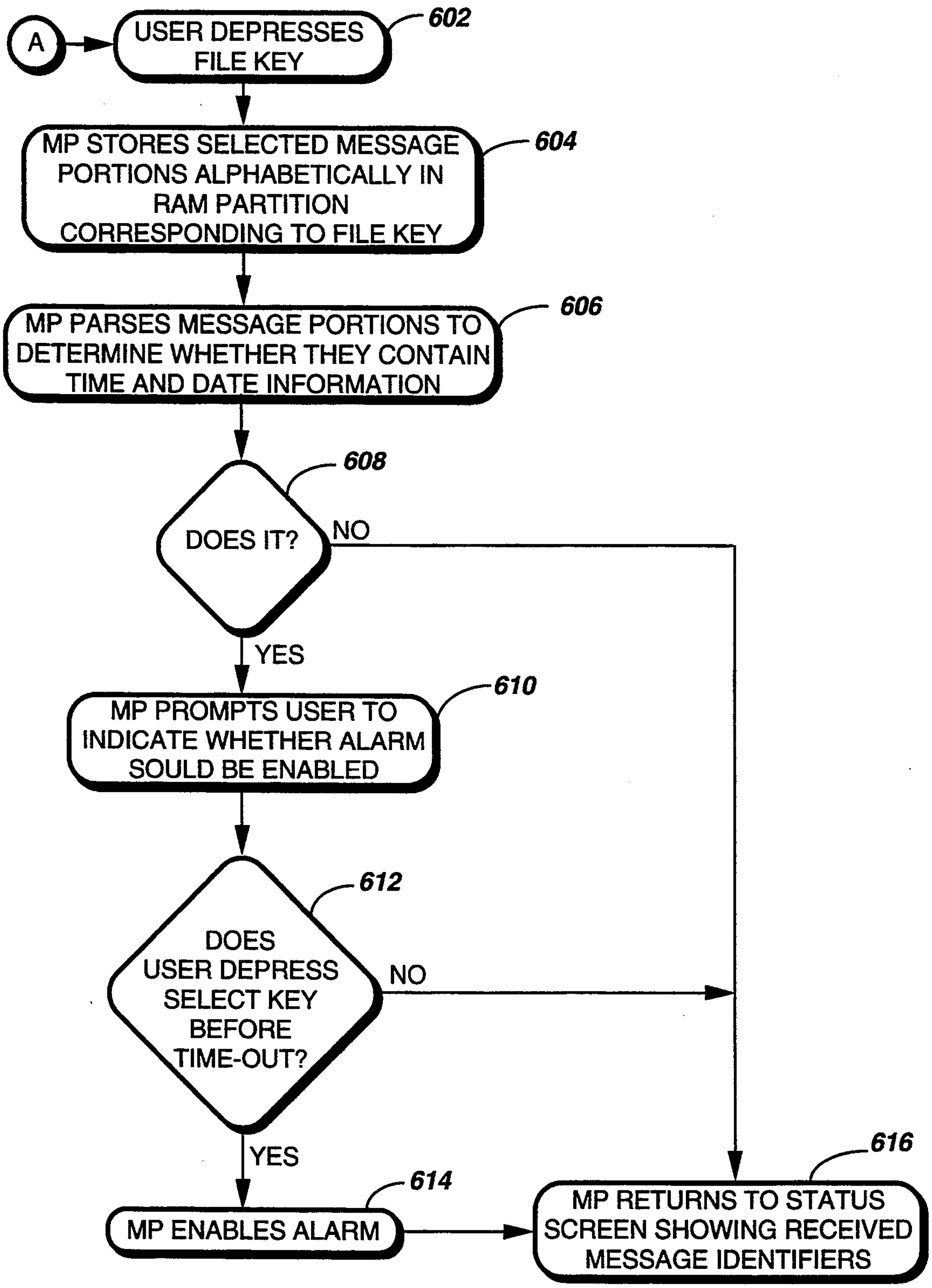
FIG. 6 is a continuation of the flow chart of the operation of a selective call receiver in accordance with the preferred embodiment of the present invention.

With reference to FIG. 6, in step 602 the user depresses a file key, e.g., the business file key 220 (FIG. 2). This causes the microprocessor 108 (FIG. 1) to access the ROM-based partition selector 130 (FIG. 1) and alphabetizer 132 (FIG. 1) to store 604 the selected message portions alphabetically in the partition in the RAM 118 (FIG. 1) corresponding to the file key, e.g., the business partition 122 (FIG. 1). Next, the microprocessor 108 accesses its message examiner 134 (FIG. 1) to examine 606 the message portions to determine whether they contain time and date information, i.e., information matching certain pre-programmed patterns, e.g., "NN/NN/NN at NN:NN PM," where N represents a numeric digit. If not, in step 608 the microprocessor 108 returns 616 the display 114 to the status screen showing the received message identifiers 206 (FIG. 2). If, on the other hand, the microprocessor 108 determines in step 608 that there is time and date information in the message portions, then the microprocessor accesses 610 its user prompter 136 to ask the user whether alarm setting is desired.

If in step 612 the user responds by depressing the select key 228 (FIG. 2) before a pre-programmed timeout, e.g., five seconds, then the microprocessor 108 (FIG. 1) accesses its alarm element 138 (FIG. 1) to enable 614 an alarm that will occur when the real-time clock 111 (FIG. 1) reaches the time and date contained in the message portions. Then the microprocessor 108 returns 616 the display 114 to the status screen showing the received message identifiers 206 (FIG. 2). If, on the other hand, the user does not respond in time in step 612, then the microprocessor 108 simply returns 616 the display 114 to the status screen showing the received message identifiers 206 (FIG. 2).

Thus, the present invention provides a way of retaining the interesting parts of a message received by a selective call receiver without having to retain the uninteresting parts. This allows a user to store portions of a message, for example, a name and telephone number, while discarding the remainder of the message to conserve memory in the selective call receiver. The present invention also provides a way of organizing the retained message parts alphabetically and by category to facilitate recalling the retained message parts at a future time. Over time, the present invention allows the user to build and access a library of useful information selected and stored by the user from messages received by the selective call receiver.

What is claimed is:

1. A method for selectively storing by a user portion of a received message in a selective call receiver comprising first and second memory means for storing the received message and the portion thereof, respectively, the second memory means having a plurality of partitions corresponding to a plurality of file types, the method comprising the steps of:

(a) defining by the user the portion of the received message stored in the first memory means to be stored in the second memory means;

(b) selecting by the user one of the plurality of partitions for storing the defined portion of the received message; and (c) storing in the selected one of the plurality of partitions the defined portion of the received message.

2. The method according to claim 1, wherein the selective call receiver further comprises display means for displaying the received message along with a message identifier and a movable indicator, and wherein step (a) comprises the steps of:

(d) moving the movable indicator to a displayed starting point of the portion of the received message;

(e) selecting the displayed starting point to which the movable indicator was moved in step (d);

(f) moving the movable indicator to a displayed ending point of the portion of the received message; and (g) selecting the displayed ending point to which the movable indicator was moved in step (f).

3. The method according to claim 1, wherein step (b) comprises the steps of:

(d) selecting one of the plurality of file types; and (e) selecting the corresponding one of the plurality of partitions for storing the portion of the received message.

4. The method according to claim 1, wherein step (c) comprises the step of:

(d) storing the portion of the received message in alphabetical order relative to previously stored portions of received messages.

5. The method according to claim 1, wherein step (a) comprises the step of:

(d) choosing from a plurality of received messages in the first memory means a received message to store selectively.

6. The method according to claim 5, wherein the selective call receiver further comprises display means for displaying the received message along with a message identifier and a movable indicator, and wherein step (d) comprises the steps of:

(e) moving the movable indicator to the message identifier corresponding to the received message to be selectively stored;

(f) selecting the message identifier to which the movable indicator was moved in step (e); and (g) displaying the received message corresponding to the message identifier selected in step (f).

7. The method according to claim 1, wherein the selective call receiver further comprises control means for controlling the selection and storing of the at least one portion of the received message, and wherein the method further comprises the steps of:

(d) examining by the control means characters of the portion of the received message defined in step (a)

to determine whether the portion of the received message contains characters matching a pre-programmed pattern corresponding to a common representation of time and date; and (e) generating a user prompt for alarm setting in response the portion of the received message having been determined in step (d) to contain characters matching the pre-programmed pattern corresponding to the common representation of time and date.

8. The method according to claim 7, further comprising the step of:

(f) setting by the control means an alarm having an activation time and date corresponding to the characters matching the pre-programmed pattern in response to a user having responded affirmatively to the user prompt.

9. A selective call receiver including an apparatus for selectively storing by a user a portion of a received message in the selective call receiver comprises:

receiver means for receiving a signal comprising an address and a message;

decoder means coupled to the receiver means for decoding the address defining an intended recipient of the message;

processor means coupled to the receiver means for processing the received message;

display means coupled to the processor means for displaying the received message;

first memory means coupled to the processor means for storing the received message;

second memory means coupled to the processor means for storing the portion of the received message, the second memory means comprising a plurality of partitions corresponding to a plurality of file types for categorizing portions of received messages stored therein; and user control means coupled to the processor means for accepting user commands for controlling the processing of the received message, wherein the user control means is utilized by the user to define the portion of the received message that is to be stored, and further to select one of the plurality of partitions for storing the portion of the received message.

10. The selective call receiver according to claim 9, wherein the display means comprises a movable indicator, and wherein the user control means comprises a movable indicator control means for moving the movable indicator to a displayed starting point and to a displayed ending point of the portion of the received message, and wherein the user control means further comprises a portion selector for selecting the portion of the received message from the displayed starting point to the displayed ending point.

11. The selective call receiver according to claim 9, wherein the processor means further comprises an alphabetizing means for storing the portion of the received message in alphabetical order relative to previously stored portions of messages.

12. The selective call receiver according to claim 9, further comprising real-time clock means, and wherein the processor means comprises examining means for examining characters of the portion of a received message to determine whether the portion of the received message contains characters matching a pre-programmed pattern corresponding to a common representation of time and date; and wherein the processor means further comprises user prompting means for generating a user prompt for alarm setting in response to the portion of the received message having been determined to contain characters matching the pre-programmed pattern corresponding to the common representation of time and date, and wherein the processor means further comprises alarm setting means coupled to the real-time clock means for setting an alarm having an activation time and date corresponding to the characters matching the pre-programmed pattern in response to a user having responded affirmatively to the user prompt.

13. The selective call receiver according to claim 9, wherein the user control means comprises selector means coupled to the processor means for selecting the portion of the received message to be stored in one of the plurality of partitions.

14. The selective call receiver according to claim 13, wherein the user control means further comprises a file selector for selecting a file type, and wherein the processor means comprises a partition selector means for selecting the one of the plurality of partitions for storing the portion of the received message such that the selected one of the plurality of partitions corresponds to the file type selected.

15. The selective call receiver according to claim 9, further comprising a message identifier means, wherein the user control means further comprises a message identifier selection means for choosing from a plurality of received messages in the first memory means a received message to be stored selectively.

16. The selective call receiver according to claim. 15, wherein the display means comprises a movable indicator, and wherein the user control means comprises a movable indicator control means for moving the movable indicator to the message identifier means corresponding to the received message to be selectively stored, and wherein the user control means further comprises an identifier selector for selecting the message identifier to which the movable indicator has been moved, and wherein the processor means comprises message retrieval means for displaying the received message corresponding to the selected message identifier.

17. A selective call receiver including an apparatus for selectively storing by a user a portion of a received message in the selective call receiver comprises:

a receiver for receiving a signal comprising an address and a message;

a decoder coupled to the receiver for decoding the address defining an intended recipient of the message;

a processor coupled to the receiver for processing the received message;

a display coupled to the processor for displaying the received message;

a first memory element coupled to the processor for storing the received message;

a second memory element coupled to the processor for storing the portion of the received message, the second memory element comprising a plurality of partitions corresponding to a plurality of file types for categorizing portions of received messages stored therein; and a user control coupled to the processor for accepting user commands for controlling the processing of the received message, wherein the user control is utilized by the user to define the portion of the received message that is to be stored, and further to select one of the plurality of partitions for storing the portion of the received message.

18. The selective call receiver according to claim 17, wherein the display comprises a movable indicator, and wherein the user control comprises a movable indicator control for moving the movable indicator to a displayed starting point and to a displayed ending point of the portion of the received message, and wherein the user control further comprises a portion selector for selecting the portion of the received message from the displayed starting point to the displayed ending point.

19. The selective call receiver according to claim 17, further comprising a message identifier, wherein the user control comprises a message identifier selector for choosing from a plurality of received messages in the first memory a received message to be stored selectively, and wherein the display comprises a movable indicator, and wherein the user control further comprises a movable indicator control for moving the movable indicator to the message identifier corresponding to the received message to be selectively stored, and wherein the user control further comprises an identifier selector for selecting the message identifier to which the movable indicator has been moved, and wherein the processor comprises a message retriever for displaying the received message corresponding to the selected message identifier.

20. The selective call receiver according to claim 17, further comprising a real-time clock, and wherein the processor comprises an examining element for examining characters of the portion of the received message to determine whether the portion of the received message contains characters matching a pre-programmed pattern corresponding to a common representation of time and date; and wherein the processor further comprises a prompting element for generating a user prompt for alarm setting in response to the portion of the received message having been determined to contain characters matching the pre-programmed pattern corresponding to the common representation of time and date, and wherein the processor further comprises an alarm setting element coupled to the real-time clock for setting an alarm having an activation time and date corresponding to the characters matching the pre,-programmed pattern in response to a user having responded affirmatively to the user prompt.

21. The selective call receiver according to claim 17, wherein the user control comprises a selector coupled to the processor for selecting the portion of the received message to be stored in one of the plurality of partitions.

22. The selective call receiver according to claim 21, wherein the user control further comprises a file selector for selecting a file type, and wherein the processor comprises a partition selector for selecting the one of the plurality of partitions for storing the portion of the received message such that the selected one of the plurality of partitions corresponds to the file type selected.

* * * * *

UNITED STATES PATENT AND TRADEMARK OFFICE
CERTIFICATE OF CORRECTION

PATENT NO. : 5,359,317

DATED : October 25, 1994

INVENTOR(S) : Gomez et al.

It is certified that error appears in the above-identified patent and that said Letters Patent is hereby corrected as shown below:

Column 6, line 2, after the word "user" insert --a--.

Column 7, line 6, after the word "response" insert --to--.

Signed and Sealed this

Fifteenth Day of August, 1995

Attest:

Bruce Lehman

BRUCE LEHMAN

*Attesting Officer*

*Commissioner of Patents and Trademarks*

US005359317C1

(12) EX PARTE REEXAMINATION CERTIFICATE (7553rd)

United States Patent

(10) Number: US 5,359,317 C1

(45) Certificate Issued: Jun. 8, 2010

Gomez et al.

(54) METHOD AND APPARATUS FOR SELECTIVELY STORING A PORTION OF A RECEIVED MESSAGE IN A SELECTIVE CALL RECEIVER

(75) Inventors: Fernando A. Gomez, West Palm Beach, FL (US); Mark T. Stair, Delray Beach, FL (US)

(73) Assignee: Motorola Inc., Schaumburg, IL (US)

Reexamination Request:
No. 90/010,455, Mar. 17, 2009

Reexamination Certificate for:

| | |
|---|---|
| Patent No.: | **5,359,317** |
| Issued: | **Oct. 25, 1994** |
| Appl. No.: | **07/958,847** |
| Filed: | **Oct. 9, 1992** |

Certificate of Correction issued Aug. 15, 1995.

(51) Int. Cl.
*G08B 5/22* (2006.01)

(52) U.S. Cl. ................ 340/7.52; 340/7.55; 340/825.22; 340/7.58

(58) Field of Classification Search ........................ None
See application file for complete search history.

(56) References Cited

U.S. PATENT DOCUMENTS

| | | | | |
|---|---|---|---|---|
| 4,899,136 A | * | 2/1990 | Beard et al. | 345/156 |
| 5,075,684 A | | 12/1991 | DeLuca | |
| 5,177,477 A | | 1/1993 | Fennell et al. | |
| 5,258,739 A | | 11/1993 | DeLuca et al. | |

FOREIGN PATENT DOCUMENTS

| | | |
|---|---|---|
| EP | 0 502 419 A2 | 9/1992 |

* cited by examiner

*Primary Examiner*—Charles Craver

(57) ABSTRACT

A method and apparatus allows a user to selectively store (604) a portion of a received message in a selective call receiver (100). The selective call receiver (100) includes first and second memory elements (118) for storing the received message and the portion thereof, respectively. The second memory element has a plurality of partitions (122, 124, 126, 128) corresponding to a plurality of file types. The user defines (FIG. 5) the portion of the receiver message stored in the first memory element, which portion is to be stored in the second memory element, and then selects (602) one of the plurality of partitions (122, 124, 126, 128) for storing the defined portion of the received message. The defined portion of the received message is then stored (604) in the selected one of the plurality of partitions (122, 124, 126, 128).

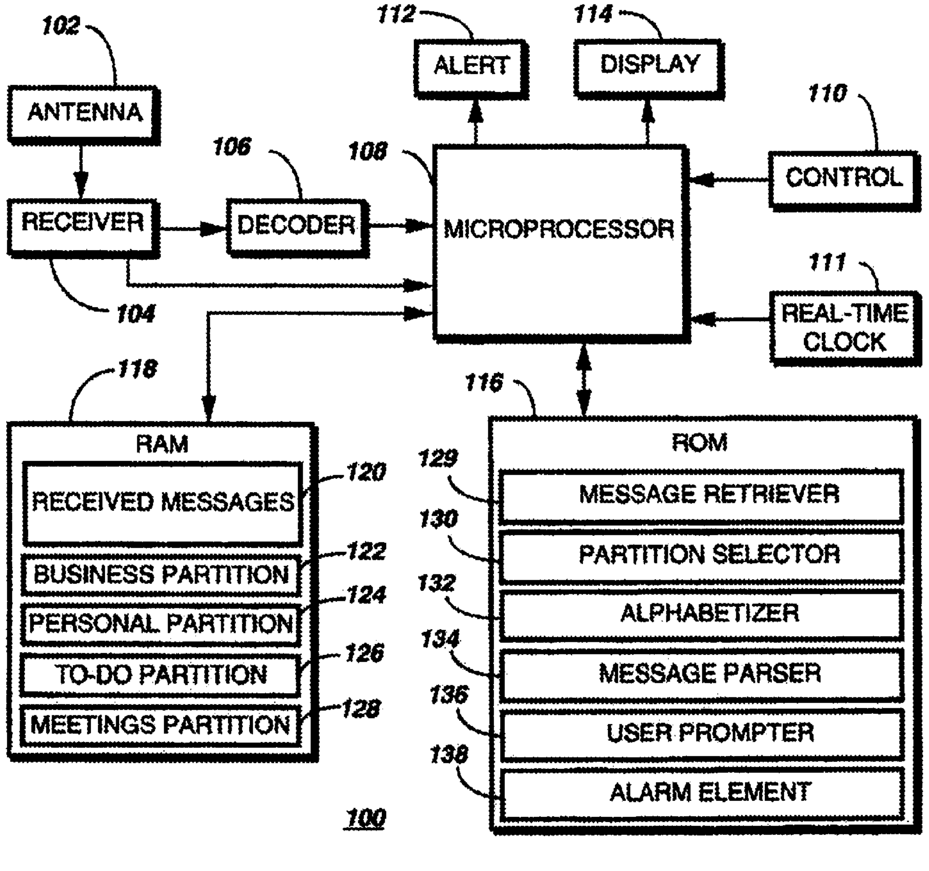

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The parentability of claims 1-6, 9-11, 13-19, 21, and 22 is confirmed.

Claims 7, 8, 12 and 20 were not reexamined.

* * * * *